US010083156B2

(12) United States Patent
Burckart et al.

(10) Patent No.: US 10,083,156 B2
(45) Date of Patent: *Sep. 25, 2018

(54) MOBILE ENABLEMENT OF WEBPAGES

(71) Applicant: International Business Machines Corporation, Armonk, NY (US)

(72) Inventors: Erik J. Burckart, Raleigh, NC (US); Dinakaran Joseph, Apex, NC (US); Todd E. Kaplinger, Raleigh, NC (US); Victor S. Moore, Lake City, FL (US)

(73) Assignee: International Business Machines Corporation, Armonk, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 13/801,820

(22) Filed: Mar. 13, 2013

(65) Prior Publication Data

US 2014/0281881 A1    Sep. 18, 2014

(51) Int. Cl.
  *G06F 17/22* (2006.01)
  *G06F 17/30* (2006.01)
(52) U.S. Cl.
  CPC .... *G06F 17/2247* (2013.01); *G06F 17/30905* (2013.01)
(58) Field of Classification Search
  CPC ........... G06F 17/3087; G06F 17/30274; G06F 17/30893; G06F 17/3089; G06F 17/3024;
  (Continued)

(56) References Cited

U.S. PATENT DOCUMENTS 6,356,899 B1 *   3/2002  Chakrabarti ...... G06F 17/30873
                                              707/737

6,980,175 B1    12/2005  Narayanaswami
(Continued)

FOREIGN PATENT DOCUMENTS

CN    101980152 A    2/2011
CN    102567384 A    7/2012
(Continued)

OTHER PUBLICATIONS

Yu Ping et al., Transforming legacy web applications to the MVC architecture, Proceedings of the eleventh annual international workshop on Software Technology and Engineering Practice (STEP 2004), Dec. 2004, DOI: 10.1109/STEP.2003.35.
(Continued)

*Primary Examiner* — James K Trujillo
*Assistant Examiner* — Fariborz Khoshnoodi
(74) *Attorney, Agent, or Firm* — Scully, Scott, Murphy & Presser, P.C.; Robert Shatto

(57) ABSTRACT

Mechanisms are provided for mobile enablement of webpages (e.g., HTML webpages). In one example, mechanisms are provided for refactoring Java Server Pages "JSP" of a web application into an abstraction layer that partitions the visual presentation elements of HTML pages of the web application into a set of views and a Javascript home page. Further, mechanisms are provided for enabling access to the HTML pages over a mobile device by stacking views one atop another (in one specific example, the views may be rendered only one view at a time as needed; in another specific example any number of views (e.g., all of the views) may be rendered at once). Further, mechanisms are provided for enabling navigation between the views for the HTML pages by providing buttons along with each view.

22 Claims, 15 Drawing Sheets

(58) Field of Classification Search
CPC ......... G06F 17/30265; G06F 17/30398; G06F 17/30572; G06F 17/30598; G06F 17/30861; G06F 17/30873; G06F 17/30905

USPC .................................................. 707/737, 754

See application file for complete search history.

(56) References Cited

U.S. PATENT DOCUMENTS

| | | | |
|---|---|---|---|
| 7,343,559 B1* | 3/2008 | Fujita et al. ................. | 715/733 |
| 7,386,786 B2 | 6/2008 | Davis et al. | |
| 7,788,577 B2 | 8/2010 | Lueck | |
| 7,911,409 B1* | 3/2011 | Chatterjee et al. ............ | 345/3.1 |
| 8,073,895 B2 | 12/2011 | Hamzeh et al. | |
| 8,627,216 B2 | 1/2014 | Brichford et al. | |
| 8,694,925 B1 | 4/2014 | Beust et al. | |
| 9,244,606 B2 | 1/2016 | Kocienda et al. | |
| 9,513,762 B1 | 12/2016 | Hakim et al. | |
| 2002/0054126 A1 | 5/2002 | Gamon | |
| 2003/0030839 A1 | 2/2003 | Walters et al. | |
| 2004/0148571 A1 | 7/2004 | Lue | |
| 2004/0172637 A1 | 9/2004 | Koutyrine | |
| 2004/0209607 A1 | 10/2004 | Stepanich et al. | |
| 2005/0091576 A1 | 4/2005 | Relyea et al. | |
| 2006/0062362 A1 | 3/2006 | Davis | |
| 2006/0085741 A1* | 4/2006 | Weiner et al. ................ | 715/517 |
| 2006/0168285 A1 | 7/2006 | Nielsen et al. | |
| 2006/0288280 A1 | 12/2006 | Makela | |
| 2007/0130525 A1 | 6/2007 | Murphy et al. | |
| 2007/0220507 A1 | 9/2007 | Back et al. | |
| 2007/0239726 A1 | 10/2007 | Weiss et al. | |
| 2008/0072139 A1 | 3/2008 | Salinas et al. | |
| 2009/0013037 A1 | 1/2009 | Bodmer et al. | |
| 2009/0125533 A1 | 5/2009 | Calbucci | |
| 2009/0132572 A1* | 5/2009 | Massie et al. ................ | 707/102 |
| 2009/0204481 A1 | 8/2009 | Navar et al. | |
| 2009/0222438 A1 | 9/2009 | Strandell et al. | |
| 2009/0327399 A1 | 12/2009 | Dorbes et al. | |
| 2010/0035657 A1 | 2/2010 | Blenessy et al. | |
| 2010/0064209 A1 | 3/2010 | Wielgosz et al. | |
| 2010/0145946 A1 | 6/2010 | Conrad et al. | |
| 2010/0169761 A1 | 7/2010 | Lee et al. | |
| 2010/0174974 A1 | 7/2010 | Brisebois et al. | |
| 2010/0199197 A1 | 8/2010 | Faletski et al. | |
| 2011/0047577 A1 | 2/2011 | Modi et al. | |
| 2011/0287750 A1 | 11/2011 | Watanabe et al. | |
| 2012/0060087 A1 | 3/2012 | Jame et al. | |
| 2012/0102429 A1* | 4/2012 | Naderi et al. ................ | 715/783 |
| 2012/0131446 A1 | 5/2012 | Park | |
| 2012/0131683 A1 | 5/2012 | Nassar et al. | |
| 2012/0159380 A1* | 6/2012 | Kocienda ............ | G06F 3/04886 715/783 |
| 2012/0220263 A1 | 8/2012 | Smith et al. | |
| 2013/0013921 A1 | 1/2013 | Bhathena et al. | |
| 2013/0086639 A1 | 4/2013 | Sondhi et al. | |
| 2013/0091439 A1* | 4/2013 | Sirpal et al. .................. | 715/752 |
| 2013/0104114 A1 | 4/2013 | Reiss et al. | |
| 2013/0152070 A1 | 6/2013 | Bhullar et al. | |
| 2013/0174015 A1 | 7/2013 | Jeff | |
| 2013/0227078 A1 | 8/2013 | Wei et al. | |
| 2013/0302005 A1 | 11/2013 | Harwell et al. | |
| 2014/0281906 A1 | 9/2014 | Burckart et al. | |

FOREIGN PATENT DOCUMENTS

| | | |
|---|---|---|
| CN | 102647716 A | 8/2012 |
| CN | 102802128 A | 11/2012 |
| CN | 102999624 A | 3/2013 |

OTHER PUBLICATIONS

Sarah Allen et al., PhoneGap, Pro Smartphone Cross-Platform Development, 2010, Part 2, pp. 131-152, DOI: 10.1007/978-1-4302-2869-1_8.

http://docs.phonegap.com/en/2.3.0/index.html, "Apache Cordova API Documentation" printed Feb. 12, 2013.

http://alebelcor.blogspot.com/2011/10/html5-apis.html, "HTML5 APIs" printed Feb. 12, 2013.

"Personalization Toolkit Workflow & Authorization Management", GXD00019_en, version 1.10, GX WebManager 9.11.0 and higher, Jan. 11, 2010, pp. 1-41.

http://en.wikipedia.org/wiki/PhoneGap, "PhoneGap" printed Feb. 7, 2013.

http://www.htmltemplates.net/, "HTML Templates", printed Feb. 4, 2013.

Rykowski, J. et al., "Personalization of Information Delivery by the Use of Agent", 2003, pp. 1056-1059.

U.S. Office Action dated Jul. 2, 2015 issued in U.S. Appl. No. 13/801,848.

U.S. Office Action dated Jul. 13, 2015 issued in U.S. Appl. No. 14/079,031.

U.S. Office Action dated Apr. 3, 2015 issued in U.S. Appl. No. 14/079,209.

U.S. Office Action dated Oct. 1, 2015 issued in U.S. Appl. No. 13/801,892.

U.S. Office Action dated Oct. 6, 2015 issued in U.S. Appl. No. 14/070,019.

U.S. Office Action dated Oct. 1, 2015 issued in U.S. Appl. No. 13/801,830.

Wieland, S., "Design and Implementation of a Gateway for Web-based Interaction and Management of Embedded Devices", Swiss Federal Institute of Technology Zurich, (Mar. 30, 2009), pp. 1-101.

Hamad, H., et al., "Performance Evaluation of RESTful Web Services for Mobile Devices", International Arab Journal of e-Technology, (Jan. 2010), vol. 1, No. 3, pp. 72-78.

Camden, R., "Converting a dynamic web site to a PhoneGap application", http://www.raymondcamden.com/2012/05/05/converting-a-dynamic-web-site-to-a-phonegap-application, (May 5, 2012), Retrieved on Aug. 19, 2015.

Lees, A., "Launch a website as a mobile app using PhoneGap/Apache Cordova", http://antonylees.blogspot.com/2013/02/launch-website-as-mobile-app-using.html, (Feb. 27, 2013), Retrieved on Aug. 19, 2015.

Myer, T., "Beginning PhoneGap", John Wiley & Sons, Inc, (Dec. 2011), 9 pages.

U.S. Office Action dated Aug. 20, 2015 issued in U.S. Appl. No. 14/079,194.

U.S. Office Action dated Aug. 27, 2015 issued in U.S. Appl. No. 14/079,100.

U.S. Office Action dated Aug. 20, 2015 issued in U.S. Appl. No. 13/801,924.

U.S. Office Action dated Sep. 2, 2015 issued in U.S. Appl. No. 14/079,209.

Office Action dated Feb. 1, 2016 received in U.S. Patent Application, namely U.S. Appl. No. 13/801,848, pp. 1-32.

Office Action dated Feb. 1, 2016 received in U.S. Patent Application, namely U.S. Appl. No. 14/079,031, pp. 1-27.

Office Action dated Dec. 30, 2015 received in U.S. Patent Application, namely U.S. Appl. No. 14/079,209, pp. 1-33.

Thomas Myer, "Beginning PhoneGap", John Wiley & Sons, Inc., 2012, total pp. 388.

Office Action dated Apr. 22, 2016, received in U.S. Appl. No. 13/801,892, 32 pages.

Andreucci, G., "Pro iOS Geo: Building Apps with Location Based Services", publication date: Jan. 30, 2013, pp. 1-9, URL:<http://techbus.safaribooksonline.com/book/programming/mobile/9781430247043/chapter-7-creating-hybrid-app>.

Office Action dated May 6, 2016, received in U.S. Appl. No. 14/070,019, 25 pages.

Office Action dated May 5, 2016, received in U.S. Appl. No. 13/801,830, 28 pages.

Office Action dated Mar. 20, 2017 received in U.S. Appl. No. 13/801,892, 25 pages.

SnipplR, "Zip code from HTML5 Geolocation", Posted on Mar. 30, 2011, retrieved from http://snipplr.com/iew/51293/zipcodefromhtml5geolocation/ on Feb. 19, 2016, 4 pages.

(56) References Cited

OTHER PUBLICATIONS

JQBatch, "jQuery Batch", https://github.com/mlmorg/jquery.batch/blob/b49eace671ec0db7f100d69521e65386a55ffeeb/README.md, Aug. 20, 2012, Retrieved on Sep. 12, 2016, 3 pages.
Office Action dated Sep. 19, 2016 received in U.S. Appl. No. 14/079,100, 17 pages.
Office Action dated Sep. 29, 2016 received in U.S. Appl. No. 13/801,830, 24 pages.
Office Action dated Oct. 3, 2016 received in U.S. Appl. No. 14/070,019, 24 pages.
Notice of Allowance dated Sep. 26, 2016 received in U.S. Appl. No. 14/079,031, 10 pages.
Notice of Allowance dated Sep. 26, 2016 received in U.S. Appl. No. 13/801,848, 10 pages.
Office Action dated Oct. 20, 2016 received in U.S. Appl. No. 14/079,209, 45 pages.
Office Action dated Apr. 20, 2017 received in U.S. Appl. No. 14/079,100, 35 pages.
Office Action dated May 4, 2017 received in U.S. Appl. No. 14/070,019, 32 pages.
Office Action dated May 5, 2017 received in U.S. Appl. No. 13/801,830, 34 pages.
Office Action dated Sep. 22, 2017 received in U.S. Appl. No. 14/070,019, 27 pages.
Office Action dated Sep. 25, 2017 received in U.S. Appl. No. 13/801,830, 28 pages.
Office Action dated Oct. 13, 2017 received in U.S. Appl. No. 13/801,892, 29 pages.
Office Action dated Aug. 1, 2017 received in U.S. Appl. No. 14/079,100, 26 pages.
Office Action dated Jun. 26, 2017 received in U.S. Appl. No. 14/079,209, 57 pages.
Office Action dated Jun. 30, 2017 received in U.S. Appl. No. 13/801,892, 32 pages.
Office Action dated Feb. 23, 2018 received in U.S. Appl. No. 14/079,100, 18 pages.
Office Action dated Jan. 9, 2018 received in U.S. Appl. No. 14/079,209, 44 pages.
Office Action dated May 7, 2018 received in U.S. Appl. No. 13/801,892, 30 pages.
Office Action dated Jan. 10, 2018 received in U.S. Appl. No. 14/070,019, 25 pages.
Office Action dated Jan. 23, 2018 received in U.S. Appl. No. 13/801,830, 26 pages.

* cited by examiner

```
1  <html>
2    <head>
3      <title>my form</title>
4    </head>
5    <%
6      com.ibm.ProfileBean profileBean = new com.ibm.ProfileBean (request.getRemoteUser ( ) ) |;
7    %>
8    <body>
9      <FORM action="http://ibm.com/updateUser" method="POST" >
10       <P>
11         <LABEL for="firstname">First name: </LABEL>
12             <INPUT type="text" id="firstName" value=<%=profileBean.firstName%>><BR>
13         <LABEL for="lastname">Last name: </LABEL>
14             <INPUT type="text" id="lastName" value=<%=profileBean.lastName%>><BR>
15         <LABEL for="email">email: </LABEL>
16             <INPUT type="text" id="email" value=<%=profileBean.email%>><BR>
17         <INPUT type="radio" name="sex" value="Male"> Male<BR>
18         <INPUT type="radio" name="sex" value="Female"> Female<BR>
19         <INPUT type="submit" value="Send"> <INPUT type="reset">
20       </P>
21     </FORM>
22   </body>
23 </html>
```

MOBILE ENABLEMENT OF WEBPAGES

CROSS-REFERENCE TO RELATED APPLICATIONS

The present application is related to commonly-owned, co-pending U.S. patent application Ser. No. 13/801,924 entitled, "TRANSFORMING APPLICATION CACHED TEMPLATE USING PERSONALIZED CONTENT", filed on Mar. 13, 2013; U.S. patent application Ser. No. 13/801,830 entitled, "MOBILE ENABLEMENT OF EXISTING WEB SITES", filed on Mar. 13, 2013; U.S. patent application Ser. No. 13/801,848 entitled, "MOBILIZING A WEB APPLICATION TO TAKE ADVANTAGE OF A NATIVE DEVICE CAPABILITY", filed on Mar. 13, 2013; and U.S. patent application Ser. No. 13/801,892 entitled, "ENHANCED MOBILIZATION OF EXISTING WEB SITES", filed on Mar. 13, 2013, the entire contents and disclosures of which are expressly incorporated by reference herein as if fully set forth herein.

BACKGROUND

The present disclosure relates generally to the field of mobile enablement of webpages (e.g., HTML webpages). In one example, the mobile enablement may be implemented by modifying an existing webpage.

SUMMARY

In one example, the present disclosure relates to the field of mobile enablement of webpages (e.g., HTML webpages).

In another example, the mobile enablement may be implemented by modifying an existing, conventional HTML webpage.

In one embodiment, a computer readable storage medium, tangibly embodying a program of instructions executable by a device for providing information to be displayed in a user interface of the device is provided, the program of instructions, when executing, performing the following steps obtaining a first webpage; obtaining a view map corresponding to the first webpage; generating a first view based at least in part upon the first webpage and the view map; generating a second view based at least in part upon the first webpage and the view map; displaying, in the user interface, the first view; and displaying, in the user interface, the second view; wherein each of the first view and the second view is displayed in the user interface independently of one another and without the first webpage; and wherein each of the first view and the second view is displayed in the user interface at times that are mutually exclusive.

In another embodiment, a computer readable storage medium, tangibly embodying a program of instructions executable by the computer for providing information to be displayed in a user interface of a device is provided, the program of instructions, when executing, performing the following steps obtaining a first webpage; identifying at least a first visual presentation portion of the first webpage; identifying at least a second visual presentation portion of the first webpage; and generating a view map defining the first visual presentation portion of the first webpage and the second visual presentation portion of the first webpage.

In another embodiment, a method for providing information to be displayed in a user interface of a device is provided, wherein the device comprises a processor, the method comprising obtaining, by the processor, a first webpage; obtaining, by the processor, a view map corresponding to the first webpage; generating, by the processor, a first view based at least in part upon the first webpage and the view map; generating, by the processor, a second view based at least in part upon the first webpage and the view map; displaying by the processor, in the user interface, the first view; and displaying by the processor, in the user interface, the second view; wherein each of the first view and the second view is displayed in the user interface independently of one another and without the first webpage; and wherein each of the first view and the second view is displayed in the user interface at times that are mutually exclusive.

In another embodiment, a system for providing information to be displayed in a user interface of a device is provided, the system comprising an obtaining element configured to obtain a first webpage and a view map corresponding to the first webpage; a generating element in operative communication with the obtaining element configured to generate: (a) a first view based at least in part upon the first webpage and the view map; and (b) a second view based at least in part upon the first webpage and the view map; and a displaying element in operative communication with the generating element configured to display, in the user interface, the first view and the second view; wherein each of the first view and the second view is displayed in the user interface independently of one another and without the first webpage; and wherein each of the first view and the second view is displayed in the user interface at times that are mutually exclusive.

In another embodiment, a method for providing information to be displayed in a user interface of a device is provided, the method comprising: obtaining, by a processor, a first webpage; identifying, by the processor, at least a first visual presentation portion of the first webpage; identifying, by the processor, at least a second visual presentation portion of the first webpage; and generating, by the processor, a view map defining the first visual presentation portion of the first webpage and the second visual presentation portion of the first webpage.

In another embodiment, a system for providing information to be displayed in a user interface of a device is provided, the system comprising: an obtaining element configured to obtain a first webpage; an identifying element in operative communication with the obtaining element configured to identify at least a first visual presentation portion of the first webpage and at least a second visual presentation portion of the first webpage; and a generating element in operative communication with the obtaining element and the identifying element configured to generate a view map defining the first visual presentation portion of the first webpage and the second visual presentation portion of the first webpage.

BRIEF DESCRIPTION OF THE DRAWINGS

Various objects, features and advantages of the present invention will become apparent to one skilled in the art, in view of the following detailed description taken in combination with the attached drawings, in which:

FIG. 9 depicts an example of code according to an embodiment.

DETAILED DESCRIPTION

Figure 1A:
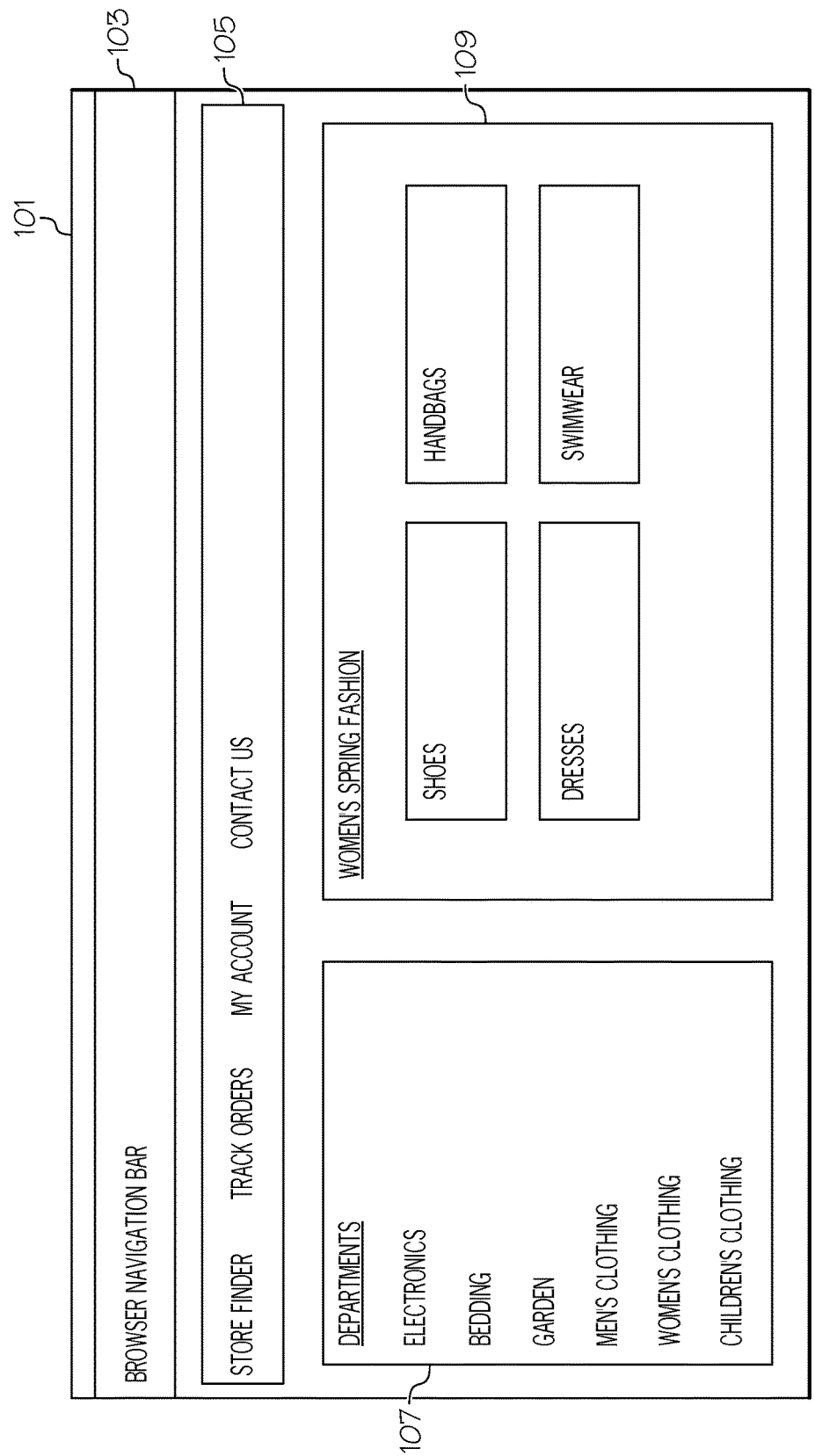
FIGS. 1A-1D and 2A-2D depict various diagrams showing an example implementation of operation according to one embodiment.

In one example, one or more systems may provide for automatic mobile enablement of webpages (e.g., HTML webpages). In another example, one or more methods may provide for automatic mobile enablement of webpages (e.g., HTML webpages). In another example, one or more algorithms may provide for automatic mobile enablement of webpages (e.g., HTML webpages).

As described herein, mechanisms are provided for creating an abstraction layer that partitions the visual presentation elements of HTML webpages into a set of views. In one example, for each HTML webpage associated with a mobile app, these views are stacked one atop another and only one view of a webpage is visible at a time. Navigation between the views for a given webpage may be provided by buttons or the like that are automatically added (e.g., for or on each view).

For the purposes of describing and claiming the present invention the term "mobile device" is intended to refer to a device that can communicate data (e.g., receive, transmit) over a network and can be carried by a user. Examples include (but are not limited to): a mobile phone, a cellular phone, a smart phone, and/or a tablet.

For the purposes of describing and claiming the present invention the term "webpage" is intended to refer to the content shown in a user interface screen displayed by a web browser.

For the purposes of describing and claiming the present invention the term "visual presentation portion" is intended to refer to a visually discernible portion of a webpage.

For the purposes of describing and claiming the present invention the term "view" is intended to refer to stand-alone visual presentation in a device of a subset of all of the visual presentation portions in a webpage.

For the purposes of describing and claiming the present invention the term "view map" is intended to refer to a computer file or document that identifies the visual presentation portions in a webpage (e.g., via identification of one or more reference-able HTML elements). In one specific example, the view map is a computer file or document that is separate from the webpage with the identified visual presentation portions.

Referring now to FIGS. 1A-1D and 2A-2D, an example implementation of operation according to one embodiment is shown. More particularly, with reference first to FIG. 1A, a web browser 101 displaying a fictional retail store webpage is shown. As seen, included by the browser is a browser navigation bar 103. Further, the webpage has various content, including store navigation section 105, department selection section 107 and women's spring fashion section 109. These sections and this webpage are, of course, provided as examples only, and any desired webpage(s) and/or section(s) may be provided.

Figure 1B:
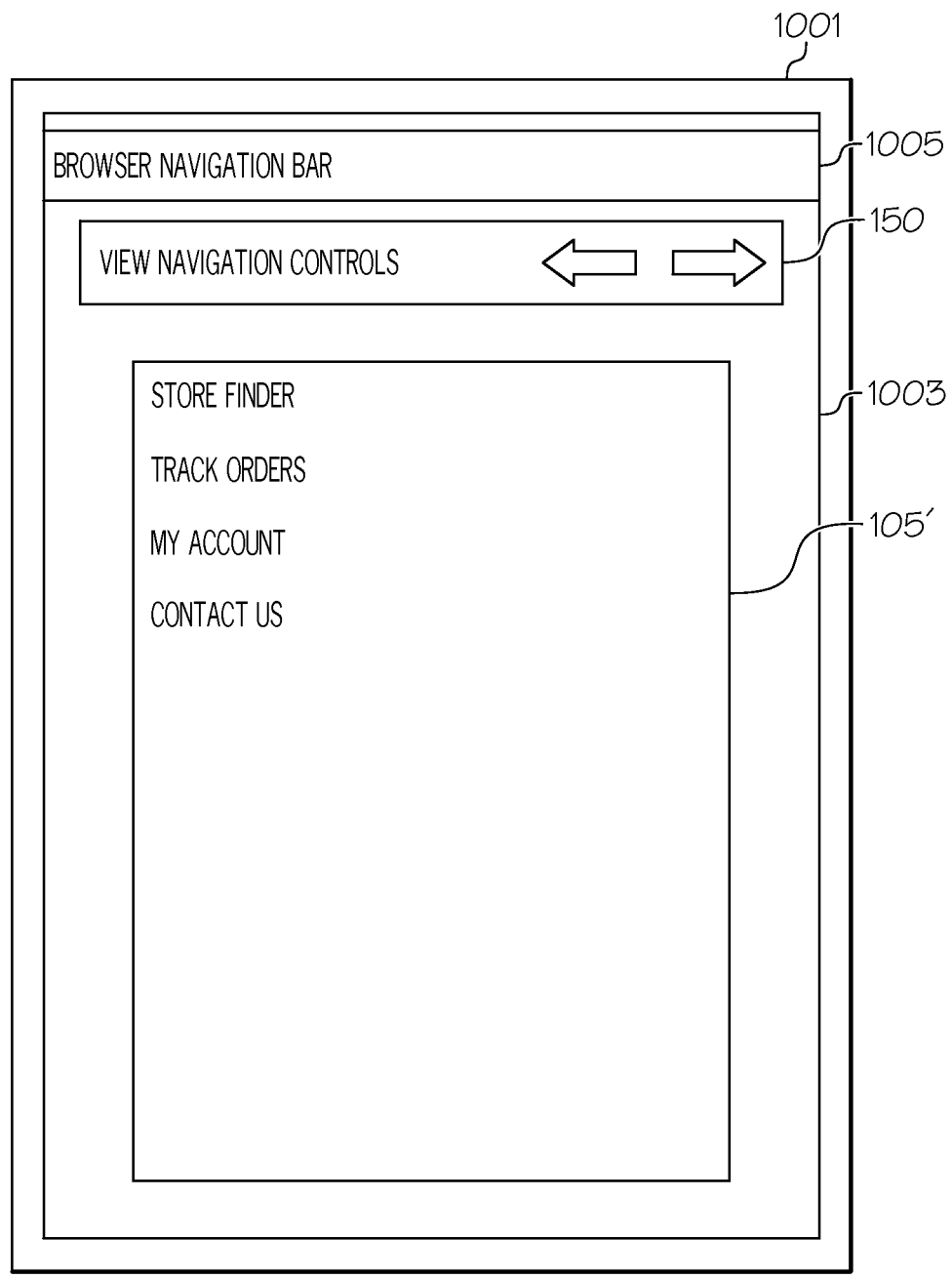

Referring now to FIG. 1B, it is seen that mobile device 1001 includes browser 1003. Browser 1003 in turn includes browser navigation bar 1005. Further, displayed within browser 1003 is store navigation section 105'. This store navigation section 105' corresponds to the store navigation section 105 of FIG. 1A. However, store navigation section 105' is presented as a dedicated view in browser 1003 of mobile device 1001. In addition, provided in browser 1003 are view navigation controls 150 (e.g., forward and backward buttons) which may be used by a user to navigate between views in browser 1003 of mobile device 1001.

Figure 1C:
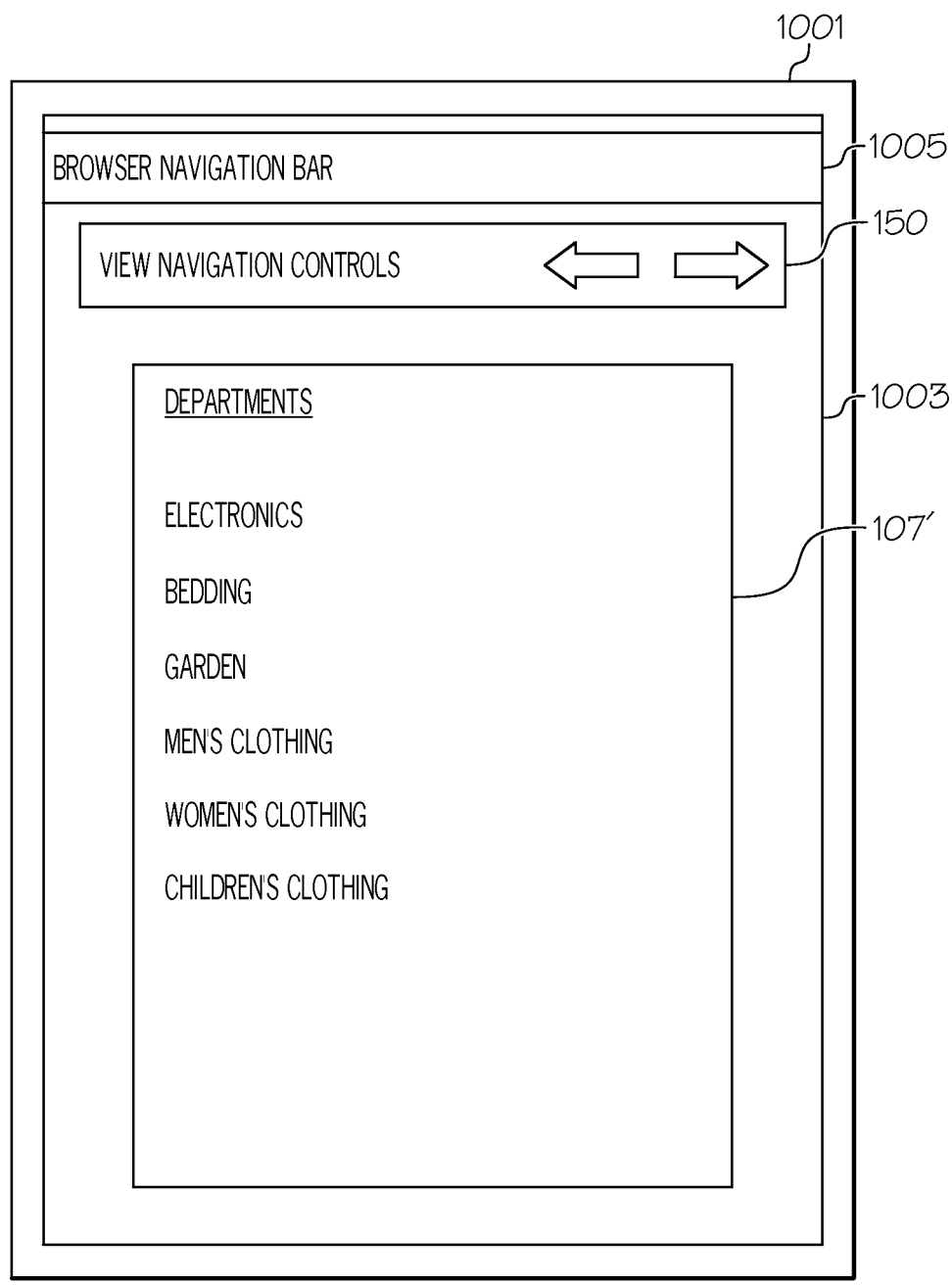

Referring now to FIG. 1C, it is seen that when the view navigation controls 150 are utilized (e.g., to move forward), browser 1003 of mobile device 1001 changes the view to department selection section 107'. Again, this department selections section 107' corresponds to the department selection section 107 of FIG. 1A. However, department selection section 107' is presented as a dedicated view in browser 1003 of mobile device 1001.

Figure 1D:
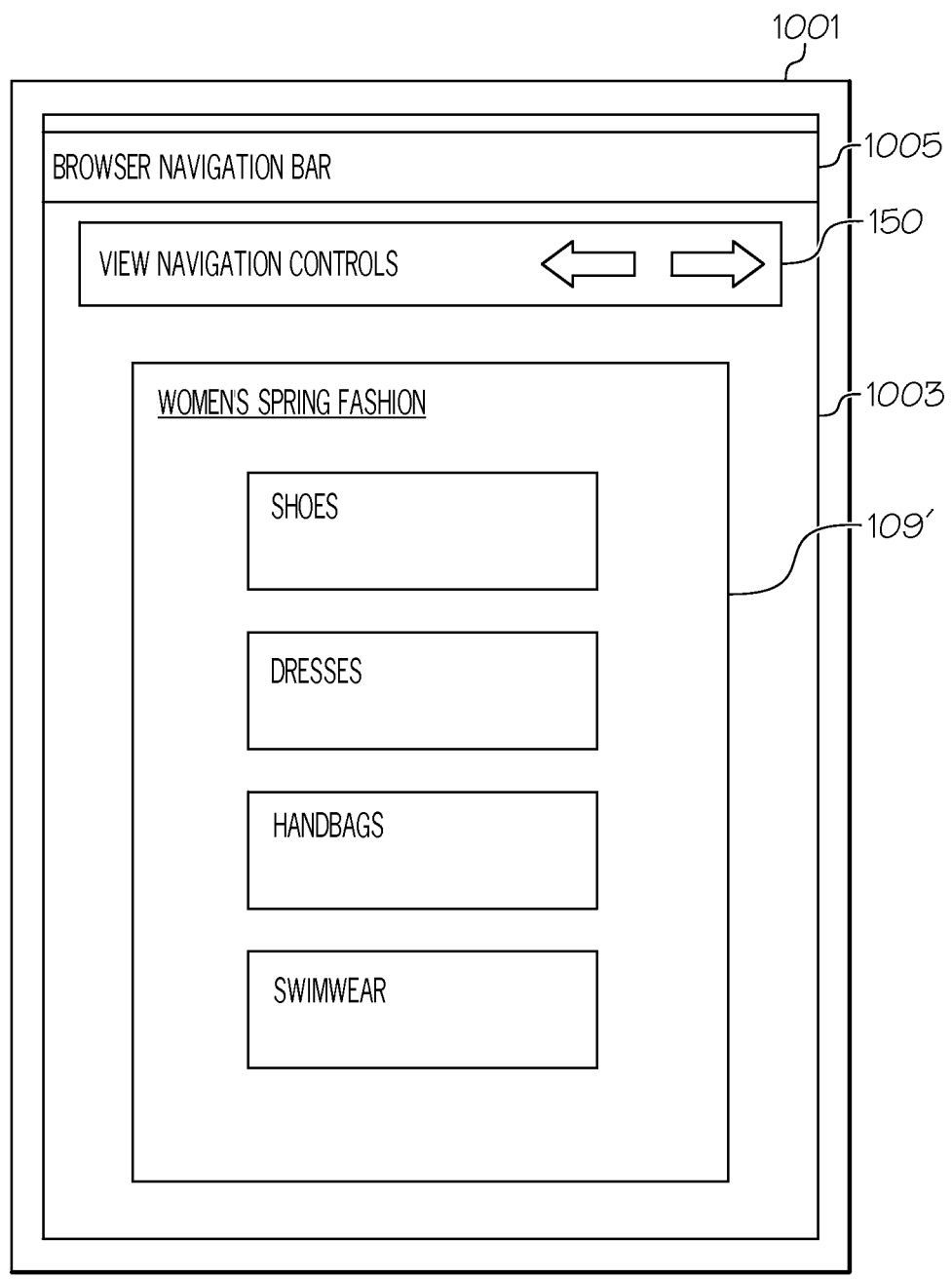

Referring now to FIG. 1D, it is seen that when the view navigation controls 150 are utilized (e.g., to again move forward), browser 1003 of mobile device 1001 changes the view to women's spring fashion section 109'. Again, this women's spring fashion section 109' corresponds to the women's spring fashion section 109 of FIG. 1A. However, women's spring fashion section 109' is presented as a dedicated view in browser 1003 of mobile device 1001.

Figure 2A:
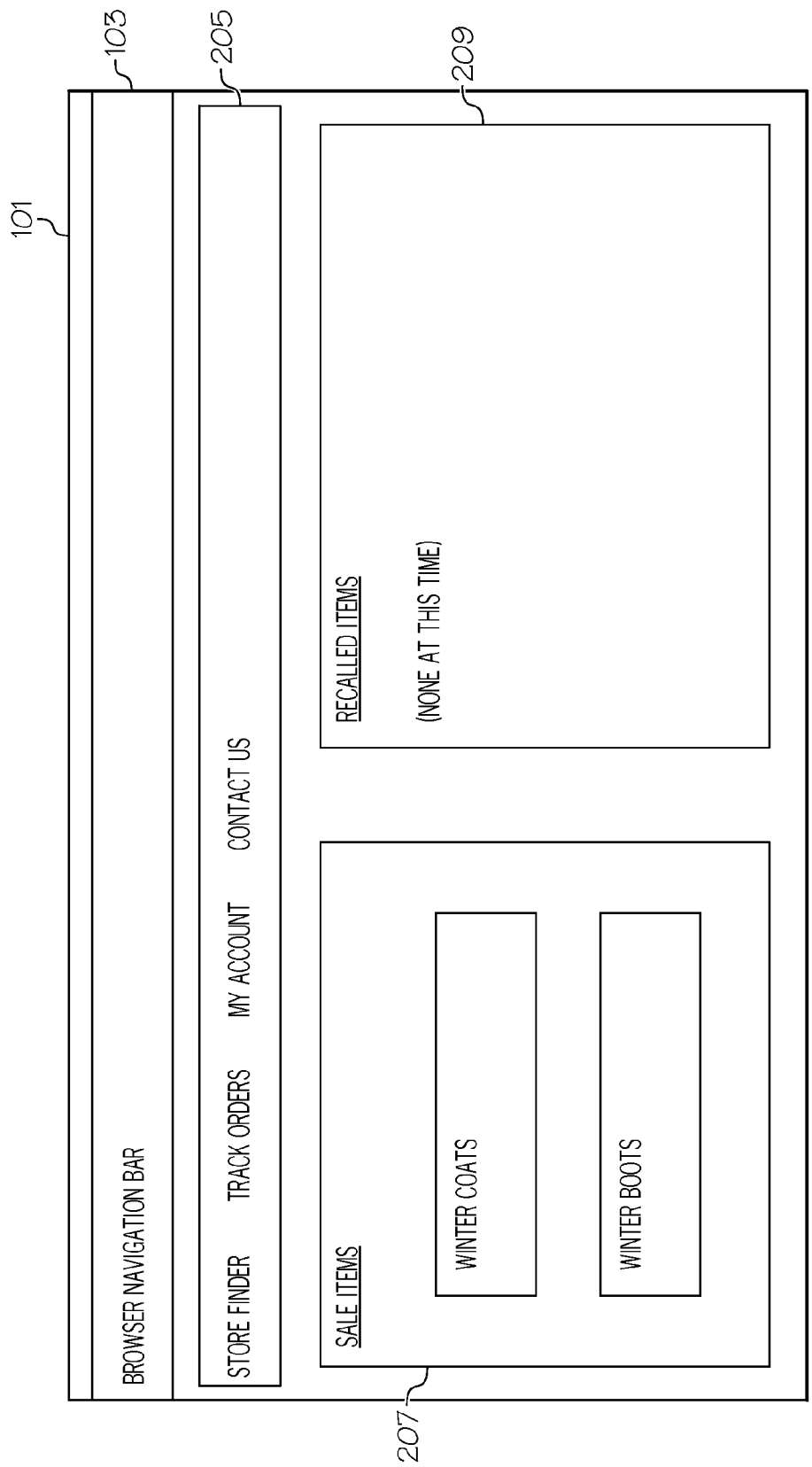

Referring now to FIG. 2A, web browser 101 is again shown displaying a second webpage (this second webpage is different from the first webpage of FIG. 1A). As seen, included again by the browser is browser navigation bar 103. Further, the second webpage has various content, including store navigation section 205 (which may be the same as store navigation section 105 of FIG. 1A or different from the store navigation section 105 of FIG. 1A), sale items section 207 and recalled items section 209. These sections and this webpage are, of course, provided as examples only, and any desired webpage(s) and/or section(s) may be provided.

Figure 2B:
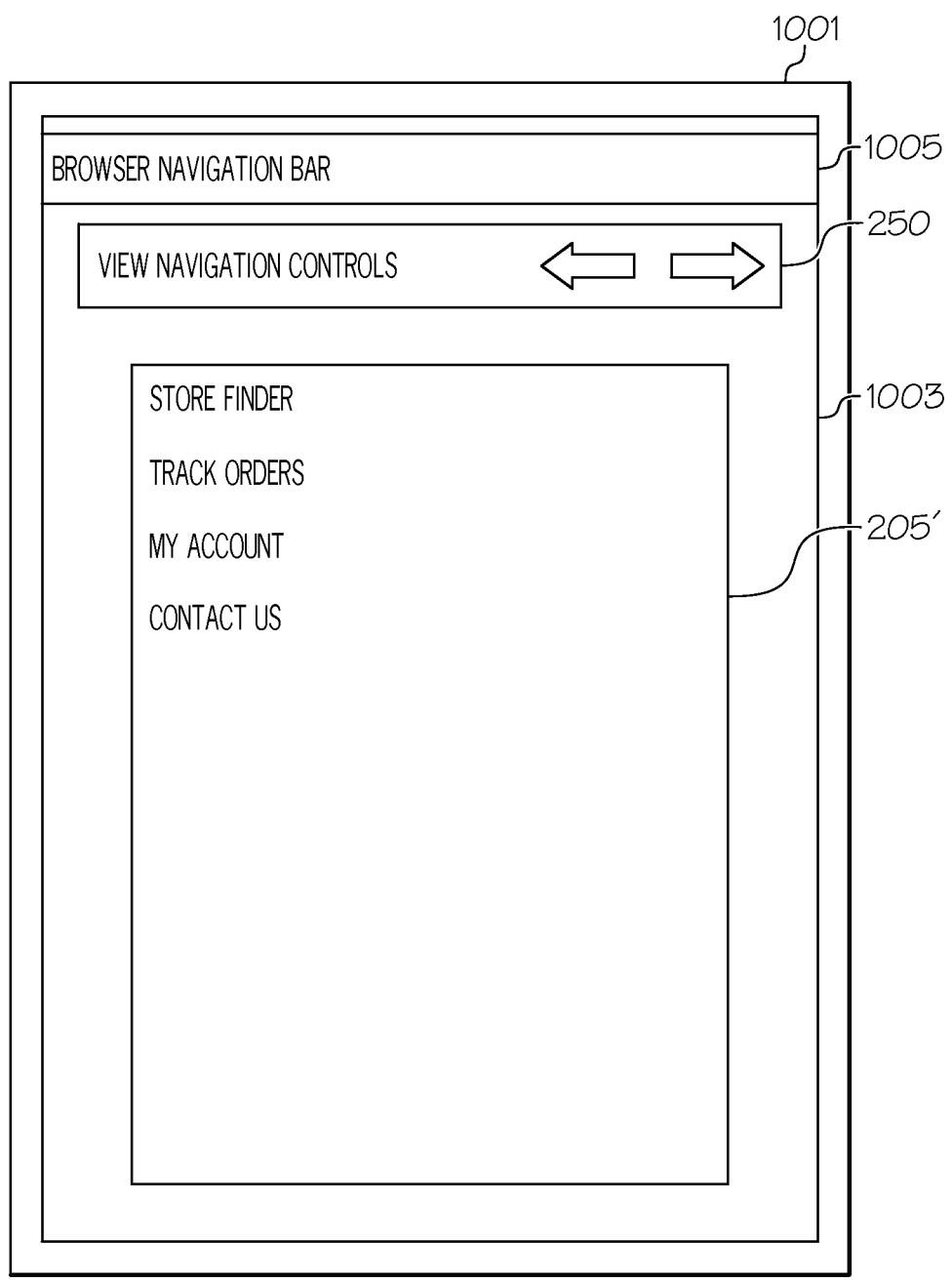

Referring now to FIG. 2B, it is seen that mobile device 1001 (which is the same as mobile device 1001 of FIGS. 1B-1D) includes browser 1003. Browser 1003 in turn includes browser navigation bar 1005. Further, displayed within browser 1003 is store navigation section 205'. This store navigation section 205' corresponds to the store navigation section 205 of FIG. 2A. However, store navigation section 205' is presented as a dedicated view in browser 1003 of mobile device 1001. In addition, provided in browser 1003 are view navigation controls 250 (e.g., forward and backward buttons) which may be used by a user to navigate between views in browser 1003 of mobile device 1001 (these view navigation controls 250 may be the same as the view navigation controls of FIGS. 1B-1D or different from the view navigation controls of FIGS. 1B-1D).

Figure 2C:
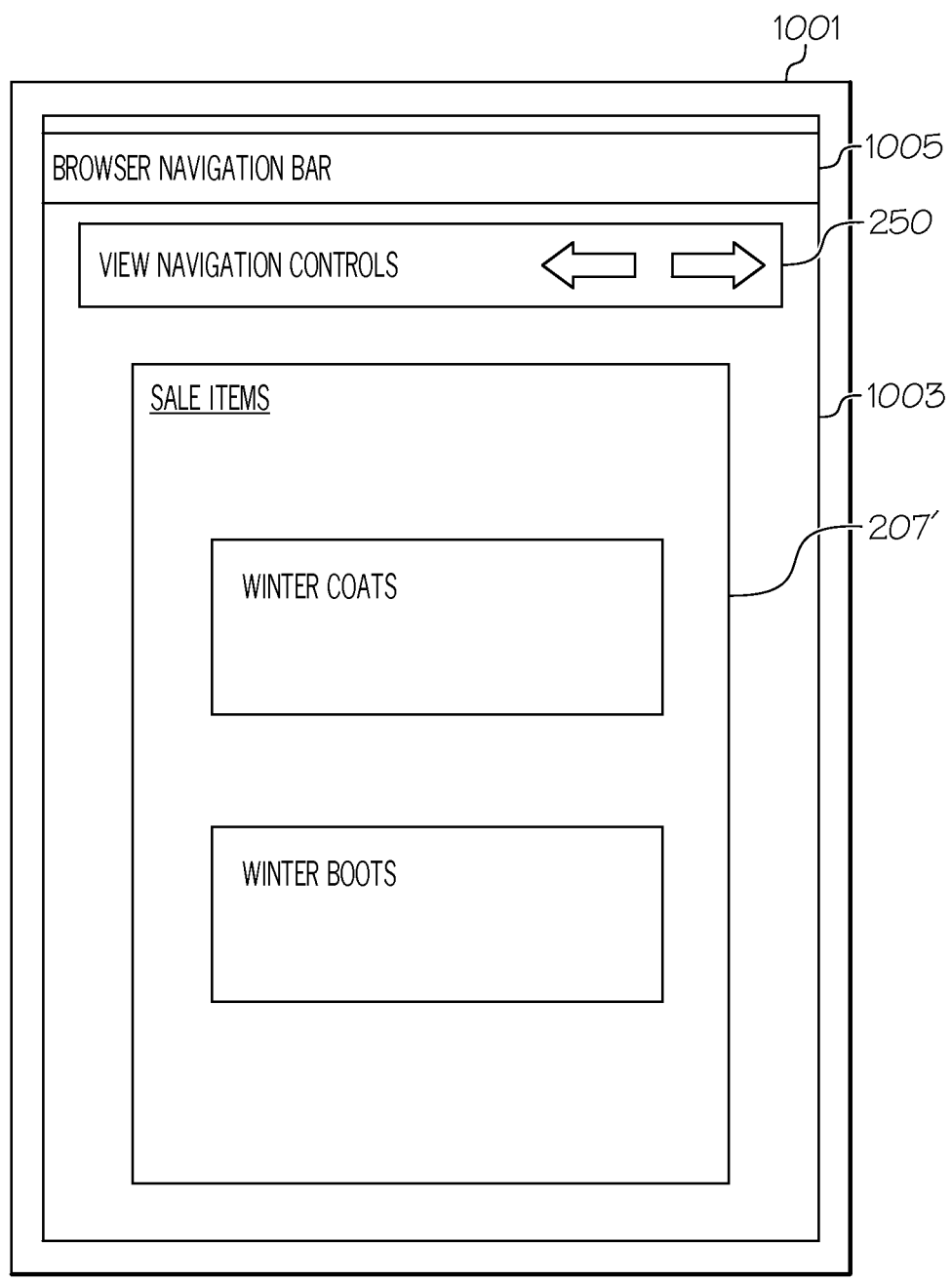

Referring now to FIG. 2C, it is seen that when the view navigation controls 250 are utilized (e.g., to move forward), browser 1003 of mobile device 1001 changes the view to sale items section 207'. Again, this sale items section 207' corresponds to the sale items section 207 of FIG. 2A. However, sale items section 207' is presented as a dedicated view in browser 1003 of mobile device 1001.

Figure 2D:
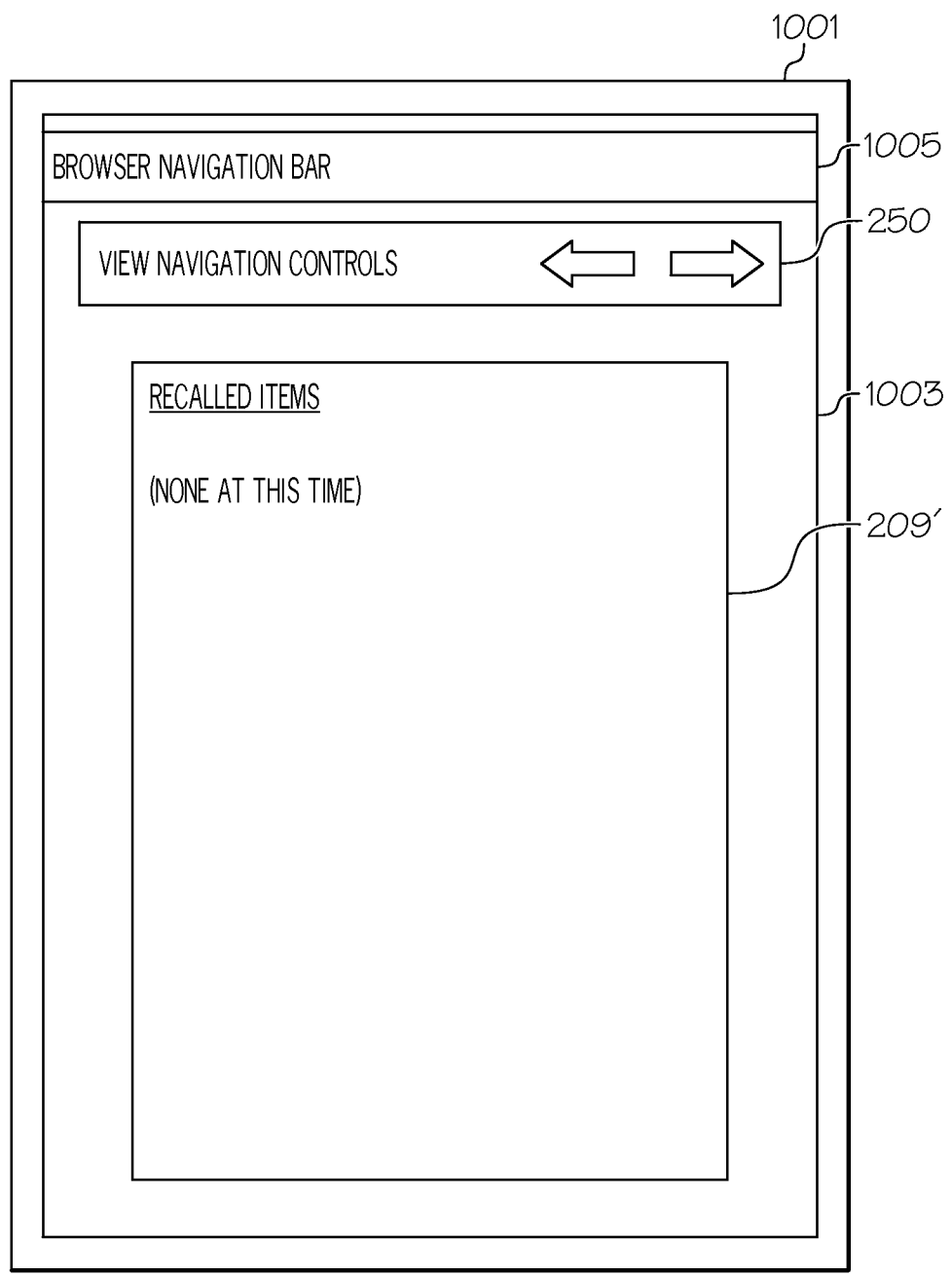

Referring now to FIG. 2D, it is seen that when the view navigation controls 250 are utilized (e.g., to again move forward), browser 1003 of mobile device 1001 changes the view to recalled items section 209'. Again, this recalled items section 209' corresponds to the recalled items section 209 of FIG. 2A. However, recalled items section 209' is presented as a dedicated view in browser 1003 of mobile device 1001.

Figure 3:
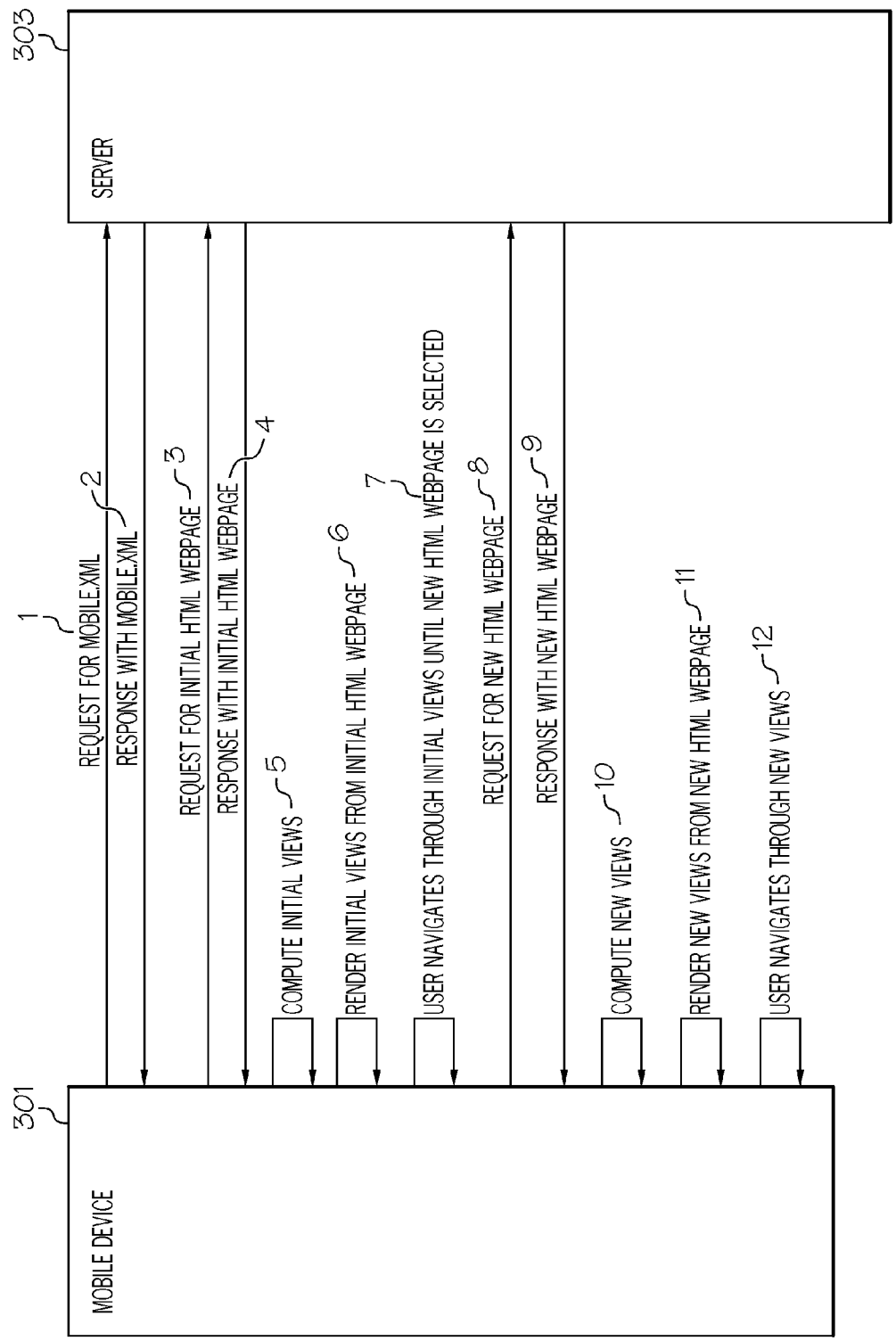
FIG. 3 depicts a diagram showing interaction between a mobile device and a server according to an embodiment.

Referring now to FIG. 3, a diagram showing interaction between a mobile device 301 and a server 303 according to an embodiment is shown. As seen, at (1) the mobile device makes a request for a view map (called, in this example, "mobile.xml"). At (2) the server responds with mobile.xml. At (3) the mobile device makes a request for an initial HTML webpage (see, e.g., the webpage of FIG. 1A). At (4) the server responses with the initial HTML webpage. At (5) the mobile device computes initial views. At (6) the mobile device renders the initial views from the initial HTML webpage. At (7) a user navigates through the initial views until a new HTML webpage is selected. At (8) the mobile device makes a request for the new HTML webpage. At (9) the server responds with the new HTML webpage (see, e.g., the webpage of FIG. 2A). At (10) the mobile device computes the new views. At (11) the mobile device renders the new views from the new HTML webpage. At (12) the user navigates through new views (this process may then be applied iteratively to additional webpages as desired).

Figure 4:
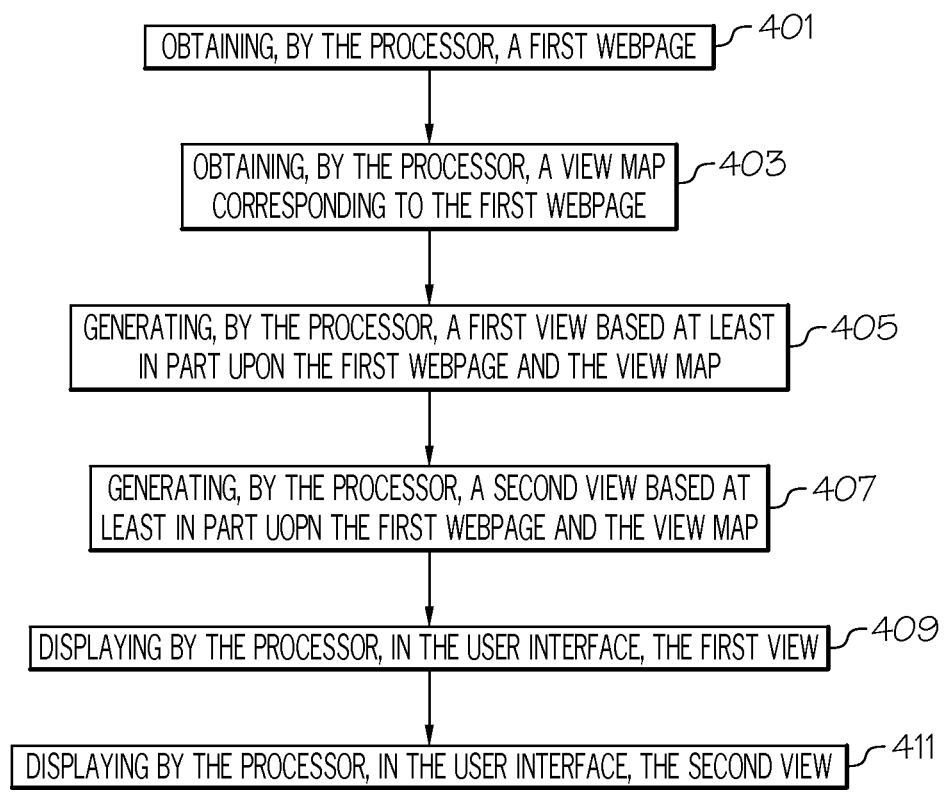
FIG. 4 depicts a flowchart of a method according to an embodiment.

Referring now to FIG. 4, a method for providing information to be displayed in a user interface of a device, wherein the device comprises a processor is shown. As seen in this FIG. 4, the method of this embodiment comprises: at 401—obtaining, by the processor, a first webpage; at 403—obtaining, by the processor, a view map corresponding to the first webpage; at 405—generating, by the processor, a first view based at least in part upon the first webpage and the view map; at 407—generating, by the processor, a second view based at least in part upon the first webpage and the view map; at 409—displaying by the processor, in the user interface, the first view; and at 411—displaying by the processor, in the user interface, the second view. Further, in various examples, each of the first view and the second view is displayed in the user interface independently of one another and without the first webpage; and each of the first view and the second view is displayed in the user interface at times that are mutually exclusive.

Figure 5:
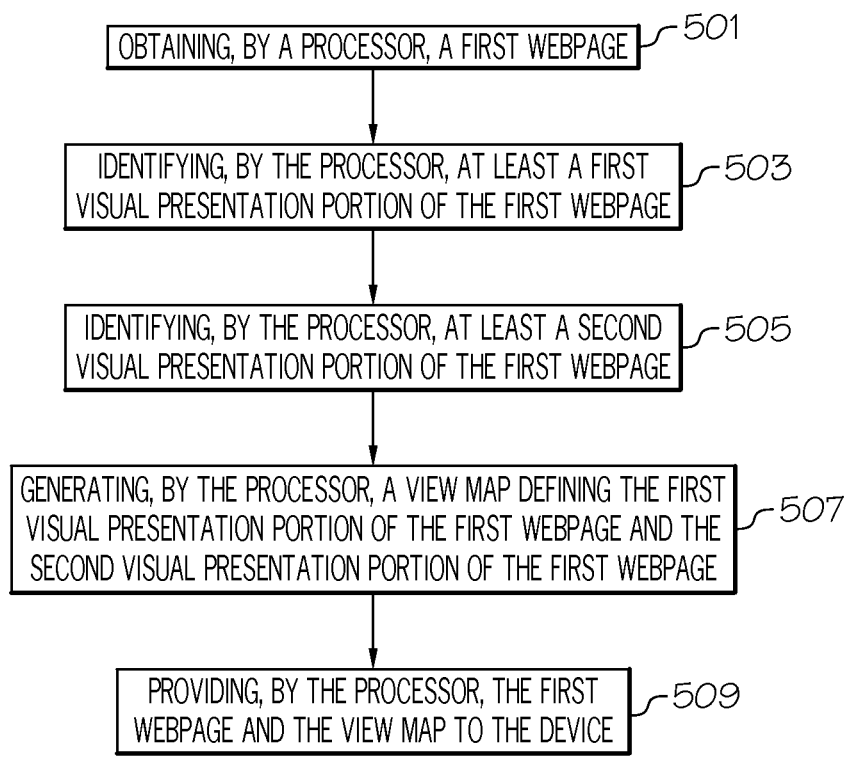
FIG. 5 depicts a flowchart of a method according to an embodiment.

Referring now to FIG. 5, a method for providing information to be displayed in a user interface of a device is shown. As seen in this FIG. 5, the method of this embodiment comprises: at 501—obtaining, by a processor, a first webpage; at 503—identifying, by the processor, at least a first visual presentation portion of the first webpage; at 505—identifying, by the processor, at least a second visual presentation portion of the first webpage; at 507—generating, by the processor, a view map defining the first visual presentation portion of the first webpage and the second visual presentation portion of the first webpage; and at 509—providing, by the processor, the first webpage and the view map to the device. In one specific example, the identifying of steps 503 and 505 may be made automatically by a computer. In another specific example, the generating of step 507 may be made automatically by a computer Referring now to the example code of FIG. 9, various specific examples of automatically performing the identifying of steps 503 and 505 and/or the generating of step 507 are discussed. In one example, the dynamic aspects are identified by the syntax defined by JSPs (similar notions exist in PHP as well). That is, in this example code 901, there are two types of JSP tags. The first is <% %> which allows the insertion of scripts (or code snippets) and the <%=%> which allows the output of dynamic content. These hints may be used to automatically extract out these elements and generate a RESTful AJAX call to obtain these values from the server.

Figure 6:
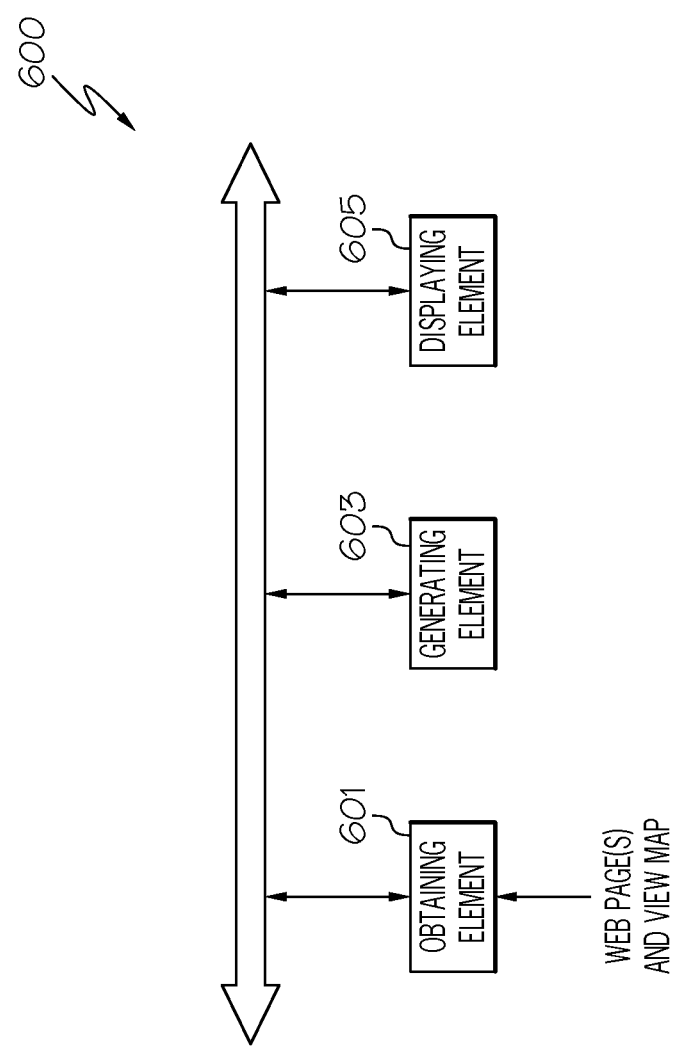
FIG. 6 depicts a block diagram of a system according to an embodiment.

Referring now to FIG. 6, in another embodiment, a system 600 for providing information to be displayed in a user interface of a device is provided. This system may include the following elements: an obtaining element 601 configured to obtain a first webpage and a view map corresponding to the first webpage; a generating element 603 in operative communication with the obtaining element configured to generate: (a) a first view based at least in part upon the first webpage and the view map; and (b) a second view based at least in part upon the first webpage and the view map; and a displaying element 605 in operative communication with the generating element configured to display, in the user interface, the first view and the second view. Further, in various examples, each of the first view and the second view is displayed in the user interface independently of one another and without the first webpage; and each of the first view and the second view is displayed in the user interface at times that are mutually exclusive.

In one example, communication between and among the various components of FIG. 6 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 8.

Figure 7:
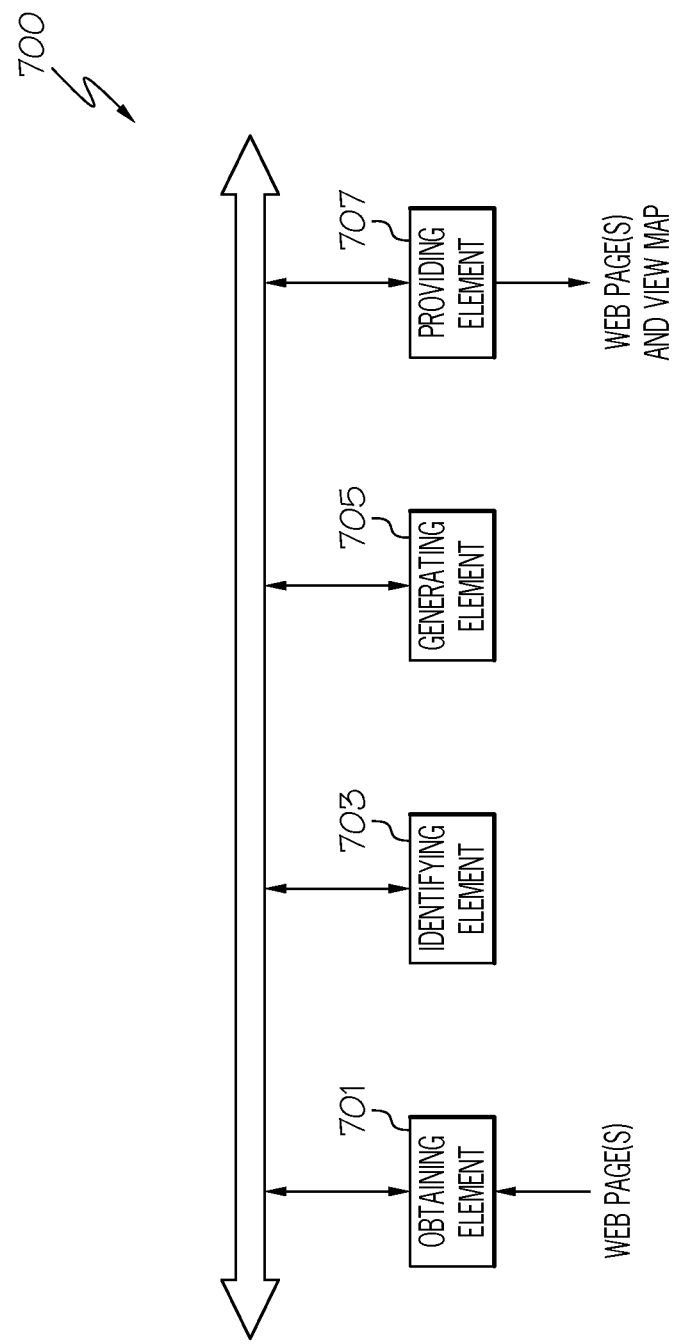
FIG. 7 depicts a block diagram of a system according to an embodiment.

Referring now to FIG. 7, in another embodiment, a system 700 for providing information to be displayed in a user interface of a device is provided. This system may include the following elements: an obtaining element 701 configured to obtain a first webpage; an identifying element 703 in operative communication with the obtaining element configured to identify at least a first visual presentation portion of the first webpage and at least a second visual presentation portion of the first webpage; a generating element 705 in operative communication with the obtaining element and the identifying element configured to generate a view map defining the first visual presentation portion of the first webpage and the second visual presentation portion of the first webpage; and a providing element 707 in operative communication with the obtaining element and the generating element configured to provide the first webpage and the view map to the device. In one specific example, the identifying may be made automatically by a computer. In another specific example, the generating may be made automatically by a computer.

Figure 8:
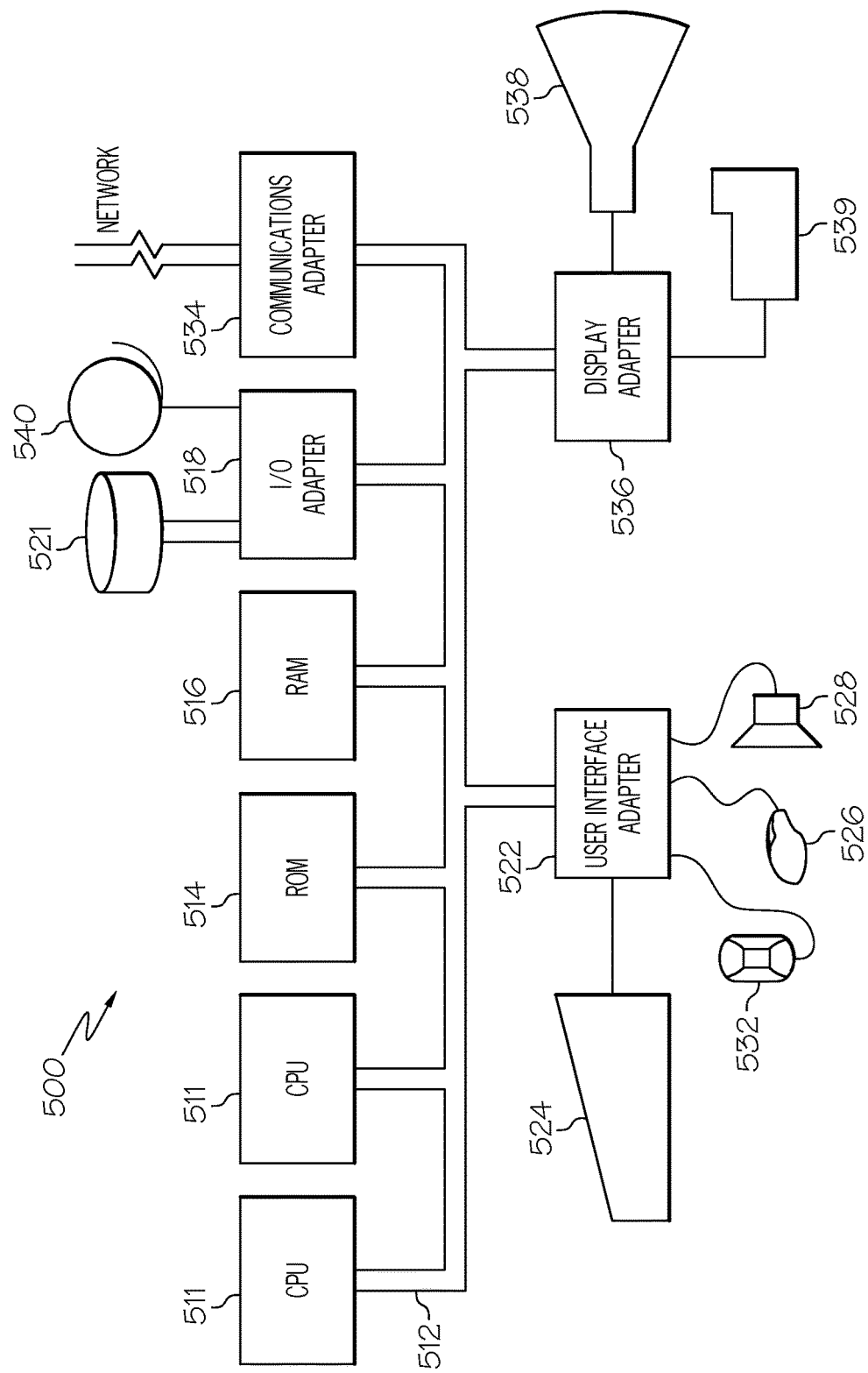
FIG. 8 depicts a block diagram of a system according to an embodiment.

In one example, communication between and among the various components of FIG. 8 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 8.

Referring now to FIG. 8, this figure shows a hardware configuration of computing system 800 according to an embodiment of the present invention. As seen, this hardware configuration has at least one processor or central processing unit (CPU) 811. The CPUs 811 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), a communications adapter 834 for connecting the system 800 to a data processing network, the Internet, an Intranet, a local area network (LAN), etc., and a display adapter 836 for connecting the bus 812 to a display device 838 and/or printer 839 (e.g., a digital printer or the like).

In another example, various mechanisms for converting an existing web application to a mobile application are provided. In one specific example, one such mechanism may comprise: converting a web application to a mobile web application by parsing and separating the web application into static content and a dynamic content with data sources; rendering the static content as hypertext markup language (HTML) pages with the links between the HTML pages converted to local links and references to dynamic content changed to Representational State Transfer (REST) requests; utilizing a mobile gateway on a remote server for accessing the dynamic content with the data sources; converting a section of a webpage for the mobile web application into a set of separate webpages (views); packaging the views into the mobile web application; and installing the mobile web application on a mobile device.

As described herein, mechanisms are provided for converting an existing browser based application into a mobile application. Such conversion may be performed by denoting sections of an existing webpage that can be pulled into a separate views. Such views may then be packaged as part of a mobile app.

As described herein, mechanisms are provided for refactoring Java Server Pages "JSP" (e.g., of a web application), partitioning elements of HTML webpages of the web application, and enabling access to the HTML webpages over a mobile device. More particularly, mechanisms are provided for refactoring JSP (e.g., of a web application) into an abstraction layer that partitions the visual presentation portions of HTML webpages of the web application into a set of views and a Javascript home page. Further, mechanisms are provided for enabling access to the HTML webpages over a mobile device by "stacking" views one atop another. In one example, views may be rendered one view at a time as needed. In another example, any number of views (e.g., all of the views) may be rendered at once. In another example, mechanisms may be provided for enabling navigation between the views by providing buttons or the like along with each view.

As described herein, in various examples each HTML webpage may be divisible into a collection of "reference able HTML" objects (see, e.g., the JSP tags of FIG. 9). These objects may be sorted into separate groups called views. Each HTML webpage may decompose into one or more views and each reference able HTML object on a page can be mapped into one or more views for that webpage. In these examples the mapping of HTML objects to views produces a view map and such a view map may be added to a mobile app package.

In one example, the mobile app now includes HTML webpages, a java script home page, and a view map. The home page loads the HTML webpages for the mobile app and its view map. In one specific example, the view map is an XML file that describes the views for each HTML webpage in the app. In another specific example, the home page java script starts by loading the dynamic data for the first HTML webpage. In this example, the entire HTML is fetched but not rendered. Next, the view map is used to channel the HTML for the first view of the first HTML webpage to the mobile device's browser for display to the user. The user may navigate between the various views for the HTML webpage by clicking on the added navigation buttons. When a link is clicked that loads a new HTML webpage, the home page java script may load the dynamic data for that new webpage and display the webpage's first view. This pattern may repeat whenever a new HTML webpage is loaded.

In another example, the mobile app package may have added to it a java script home page that's executed whenever the mobile apps icon is clicked.

In another example, some HTML webpages are said to be dynamic and as such are refreshed repeatedly at a given interval.

In another example, a full HTML webpage for a given website may be downloaded, along with a corresponding view map from a remote website (and/or server), and the individual views may be rendered.

In another example, computer program instructions (e.g., in the form of an "app") may be installed on a mobile device using any appropriate mechanism (e.g., download via a network).

As described herein, the disclosed view map may customize the associated HTML webpages for display on and manipulation by a mobile device. In one specific example, multiple view maps can be created for (and can exist for) a single mobile app (e.g., one view map for each mobile device type supported by the mobile app). In such a case, the home page java script can fetch the appropriate view map of a given mobile device type (e.g., from an appropriate mobile gateway).

In another example, the java script on a home page can sequence the views for display by a browser to users.

As described herein, mechanisms are provided for transforming web based HTML webpages into HTML webpages suitable for viewing on mobile devices.

As described herein, mechanisms are provided for generating new pages that are targeted to be packaged and deployed to a mobile device.

As described herein, mechanisms are provided for building mobile applications based upon the Javascript of websites.

As described herein, mechanisms are provided for assembling both a mobile app and its companion mobile gateway from the JSPs of a web site.

As described herein, various embodiments may be provided in the context of mobile integration; converged communications; caching, pre-fetching and pre-caching; and/or edge optimizations.

As described herein, various embodiments may be provided in the context of: (a) Cloud: Delivery model: Platform as a Service (PaaS); (b) Cloud: Delivery model: Software as a Service (SaaS); and/or (c) Software: Application development software.

As described herein, various embodiments may provide mechanisms for re-factoring Java code for mobile enablement of web applications (HTML). Example methodologies may comprise: re-factoring JavaServer Pages "JSP" for a web application into an abstraction layer that partitions each reference-able HTML object on a webpage into a view (which is mapped in a view map) for the page and a Java script home page for the HTML object; downloading the web application to a mobile device; presenting the HTML as views stacked one atop another with exactly one selectable entry and buttons provided for navigation between views; and responsive to selecting the selectable entry, executing the Java script home page for the selectable entry.

In one specific example, the Java script home page further comprises a mechanism for: downloading the dynamic data for the first HTML page without rendering the first page; and utilizing the view map to channel the HTML for the first view of the first HTML page to the mobile device; and presenting the first view of the HTML page and presenting navigation buttons for different HTML pages.

In another specific example, the view map re-factoring further comprises: providing views that focus on expressions, custom tags, and expression language references utilizing the mobile device native support.

In another specific example, the methodology may further comprise: converting a web application to a mobile web application by parsing and separating the web application into static content and a dynamic content with data sources; rendering the static content as HTML pages with the links between the HTML pages converted to local links and references to dynamic content changed to REST requests; and utilizing a mobile gateway on a remote server for accessing the dynamic content with the data sources.

As described herein, various embodiments may be applied to visual user interface (UI) elements. In other examples, application may be made to not just visual constructs (such as may be visually displayed in a browser) but also to other constructs (e.g., used for calculations in javascript).

As described herein, various mechanisms are provided to beneficially move processing from a server (e.g., via JSP) to a client.

In another example, various mechanisms may utilize one or more DIV tags (e.g., to show or hide one or more portions of a webpage).

In another example, a single HTML page may comprise multiple views.

In another example, multiple HTML pages may comprise multiple views (e.g., in a one page to one view relationship).

In one embodiment, a computer readable storage medium, tangibly embodying a program of instructions executable by a device for providing information to be displayed in a user interface of the device is provided, the program of instructions, when executing, performing the following steps: obtaining a first webpage; obtaining a view map corresponding to the first webpage; generating a first view based at least in part upon the first webpage and the view map; generating a second view based at least in part upon the first webpage and the view map; displaying, in the user interface, the first view; and displaying, in the user interface, the second view; wherein each of the first view and the second view is displayed in the user interface independently of one another and without the first webpage; and wherein each of the first view and the second view is displayed in the user interface at times that are mutually exclusive.

In one example, the user interface comprises a web browser.

In another example, the first webpage is received from a server.

In another example, the first webpage is received from the server after a request for the first webpage is transmitted to the server from the device.

In another example, the view map is received from a server.

In another example, the view map is received from the server after a request for the view map is transmitted to the server from the device.

In another example, the program of instructions, when executing further provides a navigation mechanism in the user interface to permit a user to switch between display of the first view and display of the second view.

In another example, the view map comprises an extensible markup language (XML) document.

In another example, the first webpage comprises a hypertext markup language (HTML) document.

In another example, the program of instructions, when executing, further performs the steps of: obtaining a second webpage that is distinct from the first webpage; generating a third view based at least in part upon the second webpage and the view map; generating a fourth view based at least in part upon the second webpage and the view map; displaying, in the user interface, the third view; and displaying, in the user interface, the fourth view; wherein each of the third view and the fourth view is displayed in the user interface independently of one another, independently of the first view and the second view, without the first webpage and without the second webpage; and wherein each of the first view, the second view, the third view and the fourth view is displayed in the user interface at times that are mutually exclusive.

In another example, the second webpage is received from the server.

In another example, the second webpage is received from the server after a request for the second webpage is transmitted to the server from the device.

In another example, the computer readable storage medium further comprises providing a navigation mechanism in the user interface to permit the user to switch between display of the third view and display of the fourth view.

In another example, the device comprises a mobile device.

In another embodiment, a computer readable storage medium, tangibly embodying a program of instructions executable by the computer for providing information to be displayed in a user interface of a device is provided, the program of instructions, when executing, performing the following steps: obtaining a first webpage; identifying at least a first visual presentation portion of the first webpage; identifying at least a second visual presentation portion of the first webpage; and generating a view map defining the first visual presentation portion of the first webpage and the second visual presentation portion of the first webpage.

In one example, the program of instructions, when executing, further provides the first webpage and the view map to the device.

In another example, the first webpage is provided to the device after receiving a request from the device for the first webpage.

In another example, the view map is provided to the device after receiving a request from the device for the view map.

In another example, the view map comprises an extensible markup language (XML) document.

In another example, the first webpage comprises a hypertext markup language (HTML) document.

In another example, the program of instructions, when executing, further performs the steps of: obtaining a second webpage that is distinct from the first webpage; identifying at least a first visual presentation portion of the second webpage; and identifying at least a second visual presentation portion of the second webpage; wherein the generating comprises generating a view map defining the first visual presentation portion of the first webpage, the second visual presentation portion of the first webpage, the first visual presentation portion of the second webpage and the second visual presentation portion of the second webpage.

In another example, the device comprises a mobile device.

In another embodiment, a method for providing information to be displayed in a user interface of a device is provided, wherein the device comprises a processor, the method comprising: obtaining, by the processor, a first webpage; obtaining, by the processor, a view map corresponding to the first webpage; generating, by the processor, a first view based at least in part upon the first webpage and the view map; generating, by the processor, a second view based at least in part upon the first webpage and the view map; displaying by the processor, in the user interface, the first view; and displaying by the processor, in the user interface, the second view; wherein each of the first view and the second view is displayed in the user interface independently of one another and without the first webpage; and wherein each of the first view and the second view is displayed in the user interface at times that are mutually exclusive.

In another embodiment, a system for providing information to be displayed in a user interface of a device is provided, the system comprising: an obtaining element configured to obtain a first webpage and a view map corresponding to the first webpage; a generating element in operative communication with the obtaining element configured to generate: (a) a first view based at least in part upon the first webpage and the view map; and (b) a second view based at least in part upon the first webpage and the view map; and a displaying element in operative communication with the generating element configured to display, in the user interface, the first view and the second view; wherein each of the first view and the second view is displayed in the user interface independently of one another and without the first webpage; and wherein each of the first view and the second view is displayed in the user interface at times that are mutually exclusive.

In another embodiment, a method for providing information to be displayed in a user interface of a device is provided, the method comprising: obtaining, by a processor, a first webpage; identifying, by the processor, at least a first visual presentation portion of the first webpage; identifying, by the processor, at least a second visual presentation portion of the first webpage; and generating, by the processor, a view map defining the first visual presentation portion of the first webpage and the second visual presentation portion of the first webpage.

In one example, the method further comprises providing, by the processor, the first webpage and the view map to the device.

In another embodiment, a system for providing information to be displayed in a user interface of a device is provided, the system comprising: an obtaining element configured to obtain a first webpage; an identifying element in operative communication with the obtaining element configured to identify at least a first visual presentation portion of the first webpage and at least a second visual presentation portion of the first webpage; and a generating element in operative communication with the obtaining element and the identifying element configured to generate a view map defining the first visual presentation portion of the first webpage and the second visual presentation portion of the first webpage.

In one example, the system further comprises a providing element in operative communication with the obtaining element and the generating element configured to provide the first webpage and the view map to the device.

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A computer readable storage component comprising hardware, tangibly embodying a program of instructions executable by a device for providing information to be displayed in a user interface of the device, the program of instructions, when executing, performing the following steps:

obtaining a first webpage;
obtaining a view map corresponding to the first webpage, the view map being separate from the first webpage, the view map defining a first view comprising a first subset of a plurality of elements of the first webpage and the view map defining a second view comprising a second subset of the plurality of elements of the first webpage, wherein the first and second subsets are distinct from one another;
generating the first view based upon the first webpage and the view map;
generating the second view based upon the first webpage and the view map;
displaying, in the user interface, the first view; and
displaying, in the user interface, the second view;
wherein each of the first view and the second view is displayed in the user interface independently of one another and without the first webpage; and
wherein the first view is displayed in the user interface at a first time, the second view is displayed in the user interface at a second time, and the first time and the second time are mutually exclusive such that the first view is displayed in the user interface without the second view being displayed in the user interface and the second view is displayed in the user interface without the first view being displayed in the user interface, wherein a combination of the first view and the second view shows information contained in the first webpage, wherein the program of instructions, when executing, further provides a navigation mechanism in the user interface to permit a user to switch between display of the first view and display of the second view,
wherein the first web page's display view is partitioned into a plurality of partitioned views, the first view comprising one of the plurality of partitioned views and the second view comprising another one of the plurality of partitioned views.

2. The computer readable storage component comprising hardware of claim 1, wherein the user interface comprises a web browser.

3. The computer readable storage component comprising hardware of claim 1, wherein the first webpage is received from a server.

4. The computer readable storage component comprising hardware of claim 3, wherein the first webpage is received from the server after a request for the first webpage is transmitted to the server from the device.

5. The computer readable storage component comprising hardware of claim 1, wherein the view map is received from a server.

6. The computer readable storage component comprising hardware of claim 5, wherein the view map is received from the server after a request for the view map is transmitted to the server from the device.

7. The computer readable storage component comprising hardware of claim 1, wherein the view map comprises an extensible markup language (XML) document.

8. The computer readable storage component comprising hardware of claim 1, wherein the first webpage comprises a hypertext markup language (HTML) document.

9. The computer readable storage component comprising hardware of claim 1, wherein the program of instructions, when executing, further performs the steps of:

obtaining a second webpage that is distinct from the first webpage;
generating a third view based at least in part upon the second webpage and the view map;
generating a fourth view based at least in part upon the second webpage and the view map;
displaying, in the user interface, the third view; and
displaying, in the user interface, the fourth view;
wherein each of the third view and the fourth view is displayed in the user interface independently of one another, independently of the first view and the second view, without the first webpage and without the second webpage; and
wherein each of the first view, the second view, the third view and the fourth view is displayed in the user interface at times that are mutually exclusive.

10. The computer readable storage component comprising hardware of claim 9, wherein the second webpage is received from the server.

11. The computer readable storage component comprising hardware of claim 10, wherein the second webpage is received from the server after a request for the second webpage is transmitted to the server from the device.

12. The computer readable storage component comprising hardware of claim 9, further comprising providing a navigation mechanism in the user interface to permit the user to switch between display of the third view and display of the fourth view.

13. The computer readable storage component comprising hardware of claim 1, wherein the device comprises a mobile device.

14. A computer readable storage component comprising hardware, tangibly embodying a program of instructions executable by the computer for providing information to be displayed in a user interface of a device, the program of instructions, when executing, performing the following steps:
obtaining a first webpage;
identifying at least a first visual presentation portion of the first webpage;
identifying at least a second visual presentation portion of the first webpage;
generating a view map defining the first visual presentation portion of the first webpage and the second visual presentation portion of the first webpage, wherein the view map is separate from the first webpage, wherein the view map defines the first visual presentation portion based upon a first subset of a plurality of elements of the first webpage, wherein the view map defines the second visual presentation portion based upon a second subset of the plurality of elements of the first webpage and wherein the first and second subsets are distinct from one another; and
providing the first webpage and the view map to the device;
wherein each of a first view corresponding to the first visual presentation portion and a second view corresponding to the second visual presentation portion is displayed in the user interface independently of one another and without the first webpage; and
wherein the first view is displayed in the user interface at a first time, the second view is displayed in the user interface at a second time, and the first time and the second time are mutually exclusive such that the first view is displayed in the user interface without the second view being displayed in the user interface and the second view is displayed in the user interface without the first view being displayed in the user interface, wherein a combination of the first view and the second view shows information contained in the first webpage, wherein the program of instructions, when executing, further provides a navigation mechanism in the user interface to permit a user to switch between display of the first view and display of the second view,
wherein the first web page's display view is partitioned into a plurality of partitioned views, the first view comprising one of the plurality of partitioned views and the second view comprising another one of the plurality of partitioned views.

15. The computer readable storage component comprising hardware of claim 14, wherein the first webpage is provided to the device after receiving a request from the device for the first webpage.

16. The computer readable storage component comprising hardware of claim 14, wherein the view map is provided to the device after receiving a request from the device for the view map.

17. The computer readable storage component comprising hardware of claim 14, wherein the view map comprises an extensible markup language (XML) document.

18. The computer readable storage component comprising hardware of claim 14, wherein the first webpage comprises a hypertext markup language (HTML) document.

19. The computer readable storage component comprising hardware of claim 14, wherein the program of instructions, when executing, further performs the steps of:
obtaining a second webpage that is distinct from the first webpage;
identifying at least a first visual presentation portion of the second webpage; and
identifying at least a second visual presentation portion of the second webpage;
wherein the generating comprises generating a view map defining the first visual presentation portion of the first webpage, the second visual presentation portion of the first webpage, the first visual presentation portion of the second webpage and the second visual presentation portion of the second webpage.

20. The computer readable storage component comprising hardware of claim 14, wherein the device comprises a mobile device.

21. A system for providing information to be displayed in a user interface of a device, the system comprising:
a processor; and
a memory storing computer readable instructions that, when executed by the processor, implement:
an obtaining element configured to obtain a first webpage and a view map corresponding to the first webpage, the view map being separate from the first webpage, the view map defining a first view comprising a first subset of a plurality of elements of the first webpage and the view map defining a second view comprising a second subset of the plurality of elements of the first webpage, wherein the first and second subsets are distinct from one another;
a generating element in operative communication with the obtaining element configured to generate: (a) the first view based upon the first webpage and the view map; and (b) the second view based upon the first webpage and the view map; and
a displaying element in operative communication with the generating element configured to display, in the user interface, the first view and the second view;

wherein each of the first view and the second view is displayed in the user interface independently of one another and without the first webpage; and wherein the first view is displayed in the user interface at a first time, the second view is displayed in the user interface at a second time, and the first time and the second time are mutually exclusive such that the first view is displayed in the user interface without the second view being displayed in the user interface and the second view is displayed in the user interface without the first view being displayed in the user interface, wherein a combination of the first view and the second view shows information contained in the first webpage, the computer readable instructions that, when executed by the processor, further implement a navigation mechanism in the user interface to permit a user to switch between display of the first view and display of the second view, wherein the first web page's display view is partitioned into a plurality of partitioned views, the first view comprising one of the plurality of partitioned views and the second view comprising another one of the plurality of partitioned views.

22. A system for providing information to be displayed in a user interface of a device, the system comprising:

a processor; and a memory storing computer readable instructions that, when executed by the processor, implement:

an obtaining element configured to obtain a first webpage;

an identifying element in operative communication with the obtaining element configured to identify at least a first visual presentation portion of the first webpage and at least a second visual presentation portion of the first webpage;

a generating element in operative communication with the obtaining element and the identifying element configured to generate a view map defining the first visual presentation portion of the first webpage and the second visual presentation portion of the first webpage, wherein the view map is separate from the first webpage, wherein the view map defines the first visual presentation portion based upon a first subset of a plurality of elements of the first webpage, wherein the view map defines the second visual presentation portion based upon a second subset of the plurality of elements of the first webpage and wherein the first and second subsets are distinct from one another; and a providing element in operative communication with the obtaining element and the generating element configured to provide the first webpage and the view map to the device;

wherein each of a first view corresponding to the first visual presentation portion and a second view corresponding to the second visual presentation portion is displayed in the user interface independently of one another and without the first webpage; and wherein the first view is displayed in the user interface at a first time, the second view is displayed in the user interface at a second time, and the first time and the second time are mutually exclusive such that the first view is displayed in the user interface without the second view being displayed in the user interface and the second view is displayed in the user interface without the first view being displayed in the user interface, wherein a combination of the first view and the second view shows information contained in the first webpage, wherein the computer readable instructions further provide a navigation mechanism in the user interface to permit a user to switch between display of the first view and display of the second view, wherein the first web page's display view is partitioned into a plurality of partitioned views, the first view comprising one of the plurality of partitioned views and the second view comprising another one of the plurality of partitioned views.

* * * * *